United States Patent
Yao et al.

(10) Patent No.: US 11,244,016 B2
(45) Date of Patent: Feb. 8, 2022

(54) JOURNALING ENGINE

(71) Applicant: VISA INTERNATIONAL SERVICE ASSOCIATION, San Francisco, CA (US)

(72) Inventors: Gary Yao, Newark, CA (US); Shruti Vijay Apraj, Sunnyvale, CA (US); Samuel Acuna, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 375 days.

(21) Appl. No.: 16/133,291

(22) Filed: Sep. 17, 2018

(65) Prior Publication Data
US 2020/0089810 A1 Mar. 19, 2020

(51) Int. Cl.
*G06F 16/9535* (2019.01)
*G06F 16/901* (2019.01)
*G06F 16/904* (2019.01)
*G06Q 40/06* (2012.01)
*G06N 5/00* (2006.01)

(52) U.S. Cl.
CPC ........ *G06F 16/9535* (2019.01); *G06F 16/901* (2019.01); *G06F 16/904* (2019.01); *G06N 5/003* (2013.01); *G06Q 40/06* (2013.01)

(58) Field of Classification Search
CPC ............... G06Q 30/0255; G06Q 40/02; G06F 16/2228; G06F 16/9535; G06N 5/00
USPC ................................................. 707/736, 754
See application file for complete search history.

(56) References Cited

U.S. PATENT DOCUMENTS

| 2013/0232435 | A1* | 9/2013 | Knapp | H04L 12/1859 715/771 |
| 2014/0142994 | A1* | 5/2014 | Matarazzi | G06Q 50/01 705/5 |
| 2014/0214635 | A1* | 7/2014 | Just | G06Q 40/12 705/30 |
| 2015/0242961 | A1 | 8/2015 | Caskey | |
| 2017/0161651 | A1 | 6/2017 | Demarchi | |
| 2020/0065785 | A1* | 2/2020 | Hart | G06Q 20/108 |

OTHER PUBLICATIONS

Extended European Search Report for Application No. EP19197792. 5, dated Jan. 27, 2020, 8 pages.

* cited by examiner

*Primary Examiner* — Robert W Beausoliel, Jr.
*Assistant Examiner* — Pedro J Santos
(74) *Attorney, Agent, or Firm* — Loeb & Loeb LLP (57) ABSTRACT

A journaling engine receives input from a variety of sources to synthesize editable journal of experiences over a given date range. The engine uses application program interfaces to interface to a transaction database for cataloging experiences during an event. The engine further evaluates transactions to retrieve venue and activity information associated with the experiences. The user may edit the journal by adding or subtracting experiences. The final journal may be posted to social media by exporting the journal in an appropriate format. The user and those viewing the journal on social media may receive offers related to the experiences in the journal or similar experiences local to the user and viewers.

19 Claims, 8 Drawing Sheets

Raw Data from initial search
- Uber Airport
- Restaurant 1
- Amusement Park
- Restaurant 2
- Department store
- History museum
- Home Improvement – online
- National Park
- Municipal Water Bill – October
- Restaurant 3
- Uber Airport
- Parking Garage
- Grocery Store

JOURNALING ENGINE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Often people traveling may move from one destination to another, visiting interesting places and eating unique cuisine. However, after even a few days the experiences may run together and one may lose track of the sequence of events or even forget an event entirely.

SUMMARY

In an embodiment, an engine monitors financial transactions to build a journal of activities and creates editable documents suitable for sharing on social media. The engine may collect transaction information to determine a destination and then may collect public information about the site to supplement a user's own description. Events may be placed on a timeline or sequenced on a map to easily allow reviewing or sharing experiences. The user may enter start and end dates as well as what financial instruments were used during the trip to allow the engine to query financial transactions and build the journal for the user, either in real time or after a trip is completed. Unlike a personal journal, the engine can draw on external resources to supplement the location information with maps as well as linking to photos stored in accessible databases to build a comprehensive record of the journey. After editing, if needed, the user may share the journal or simply keep it as a private reference. The engine may further generate recommendations to the user, a viewer, or both, based both on the user's experience as well as data generated by others about a destination.

BRIEF DESCRIPTION OF THE DRAWINGS

The figures depict a preferred embodiment for purposes of illustration only. Alternative embodiments of the structures and methods illustrated herein may be employed without departing from the principles described herein.

DETAILED DESCRIPTION

Often, when returning from an event, such as a vacation, business trip, concert, or similar activity, one is asked, "What did you do on your trip?" The question may come from family, friends, coworkers, baristas, among others. A computing platform allows automatic generation of a journal of an event so that the sharing process is both simple and accurate. The computing platform is constructed to optimize receipt of data from multiple sources to generate a timeline or journal of activity for a user over the course of an event. The event may be a journey, such as a vacation or a business trip, a concert, a family outing, or other activities. The journal may be based on a combination of the financial transactions generated over a specified time period, the location of the purchase, public data about the location, map data, and other user information, such as digital images. The computer platform, or journaling engine, may have a user interface module that both receives input regarding a particular activity/date-range and generates a graphical output in a selectable format suitable for different target systems from personal consumption on a cell phone, tablet, or laptop, to social media platforms including Facebook, Snapchat, or Instagram. A database portion stores and organizes inputs received from the various available inputs. A query generator interfaces with the user interface module to formulate, send, and receive queries to data sources, and format the results relevant to the search for storage in the database. By optimizing query results for storage in the customized fields of the database, the system may operate more efficiently than a generalized database. This may be important given the high volumes of transactions available for processing. Further, if the output format is specified before the query is initiated, the search may be tailored to that output so that only query items relevant to that specific output are retrieved.

The journaling engine may also have a connection to a recommendation source that receives details of places and activities and generates recommendations for the viewer. The viewer may be the original user who is viewing his or her own trip or may be another person who is viewing the original user's activity record, for example, via a social media platform. The recommendation, for example, may include similar venues to one recently visited or may be for other popular attractions in the same area. In some embodiments, offers or coupons may be provided for the recommended attractions.

Figure 1:
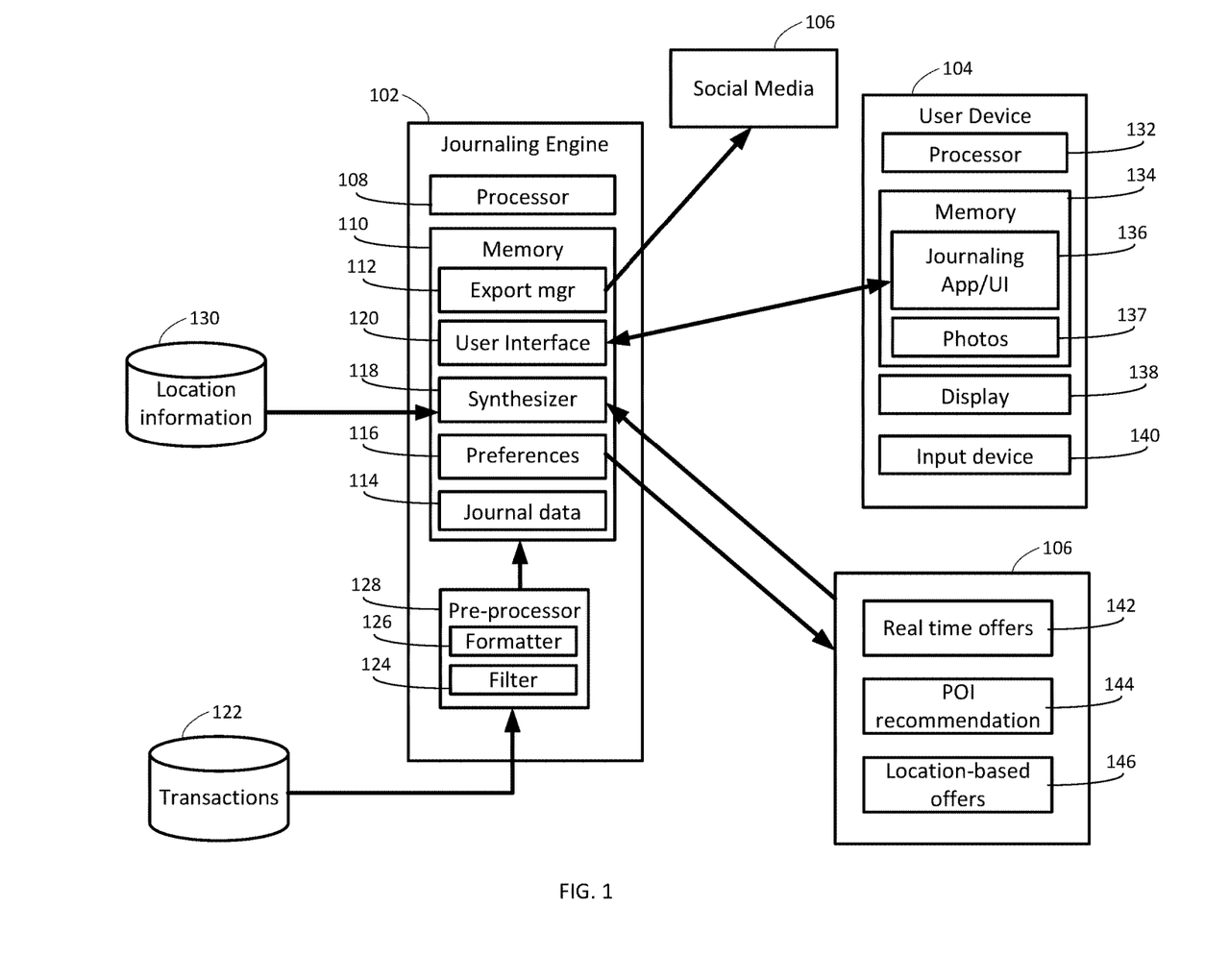
FIG. 1 is a block diagram of entities participating automated event journaling.

Turning to FIG. 1, a journaling engine 102 may be communicatively coupled to a user device 104 and a recommendation engine 106. The journaling engine 102 may include a processor 108 and a memory 110 that stores executable code and data used by the journaling engine 102. An external transaction database 122 may be used as a source of information for building a journal of an event or activity. Location information may be received via a location data source 130. The location data source 130 will be discussed in more detail below. Recommendations and offers may be received by a recommendation engine 106.

Returning to the journaling engine 102, the engine 102 may be a server-based system but in other embodiments may be a distributed system. In other embodiments, the engine 102 may be cloud-based. However, in any of the configurations, accommodations for high volume and high speed data access may need to be made, as discussed more below.

A preprocessor 128 may receive data from the transaction database 122 where a filter 124 may remove certain transactions using rules or an AI engine (not depicted) to identify transactions that may not be relevant to the event. A formatter 126 may remove information not relevant to the journaling activity, such as a transaction identifiers or merchant codes. The preprocessor 128 may include very high speed data inputs for receiving data from the transactions database. For example, collecting several megabytes of data for an event for each of potentially several million simultaneous users may require parallel high speed input processors. Similarly, the filter 124 and formatter 126 may use a massively parallel processing architecture for thread creation and clean up so that the high volumes of data may be accommodated.

The memory 110 may include a number of repositories or code modules used to successively operate on the received data to build the journal in the desired format, whether for archiving locally or for sharing on social media. The output of the preprocessor 128 may be stored in a journal data repository 114. The journal data may be organized by user and by event. Given the high volumes of data captured over a universe of users, the journal data may be reduced in size using coding techniques. The stored data may additionally be encrypted to reduce the possible compromise of personal information in the event of a data breach even though many personal details may be removed during the filtering and formatting process.

Preferences may be collected and stored via a preferences module 116. Preferences may include types of experiences to present, a preferred output format, access privileges, as well as presentation details such as initial view, font sizes, etc. Preferences may also be used to specify how point of interest (POI) information, real time offers, and location-based offers are selected and delivered to the user. For example, some users may choose to have real time offers notified via a text message or social media alert. Other users may choose not to receive real time offers at all. Similarly, some users may prefer POI information to be relayed only about the location of the event(s) while others may prefer POI information about local attractions similar to those visit during a trip.

A synthesizer module 118 may extract details from the journal data, in view of the user's preferences, to formulate queries for supplemental data related to the event. In an embodiment, one such query may involve performing an Internet search for data related to a particular location or venue. For example, a trip to the Grand Canyon may prompt queries related to facts about the Grand Canyon, related websites, stock photos, etc., that are publicly available. In an embodiment, given the proper permissions, photos taken by the user during the trip may be incorporated from the user device 104, as discussed more below. Additional queries may be made to the recommendations engine 106 to receive information about points of interest and other offers relevant to the event. For example, once a venue is identified, an additional query related to the geographic location of the venue may be placed, allowing latitude and longitude coordinates to be associated with the venue. These coordinates may be used to place the venue on a map of locations associated with the even. Once the data is collected for an event, the synthesizer may generate and store a digital object representing the original and collected event data in a standardized format. In an embodiment, the synthesizer 118 may store the digital object in the journal data memory. In cases where the journal data is compressed and/or encrypted, use of the journal data memory may allow those options to be applied to the digital object.

A user interface 120 may interface with the user device 104 for various interactions with the user. In various embodiments, the user device 104 may be smartphone, a tablet, a laptop computer, a desktop computer, a kiosk, or other device supporting interaction with a user. The user interface module 120 of the journaling engine 102 may allow access for user's via a web browser or via an application 136 on the user device 104. The user may interact with the journaling engine 102 at various stages in the journaling process, including, but not limited to, setting initial preferences, prescribing a particular date range, as well as reviewing and updating the final package for release.

An export manager 112 may take the synthesized journal data that is stored, for example, in a standardized format and generate various output files in a format specific to its target platform. For example, if the target is a web browser, the export module may generate a JavaScript file that may be directly read by a browser. In another case, the export manager 112 may generate a formatted file following any of a number of social media target guidelines. In other embodiments, the export module may take geographic coordinates and generate a map-ready file for use with a mapping application.

The user device 104, as discussed above, may be any of several device types. Unlike the journaling engine 102, and more particularly, the preprocessor 128 and journal data storage 114 that use highly customized processing architectures, the user device 104 may be off-the-shelf items customized only by the applications installed on it. The user device 104 may include a processor 132 and a memory 134, as well as a display 138 and input device 140. In some cases, the display 138 and input device 140 may be integrated, such as a smartphone with a touchscreen user interface. The memory 134 may host executable code, such as the journaling application 136 as well as data storage, such as photos 137.

The recommendation engine 106 may be a single processor or server, or may be a distributed, multi-server implementation or may be hosted in a cloud computing environment. In one embodiment, the recommendation engine 106 may be accessed via an API supporting both pull and push access to real time offers 142, location-based offers 144 and POI recommendations 146. Each of these services may analyze data known about the user, both from the details of a particular event, as well as other information gathered about the user to generate information expected to be of interest to the user. In another case, persons who observe an event posting, for example, on social media may receive POI recommendations and offers based primarily on the event. For example, real time offers may be made for locations at or near event venues. Location-based offers may be made for future visits to the locations associated with the events, as well as POI information for both venues listed in the event and those nearby.

Figure 2:
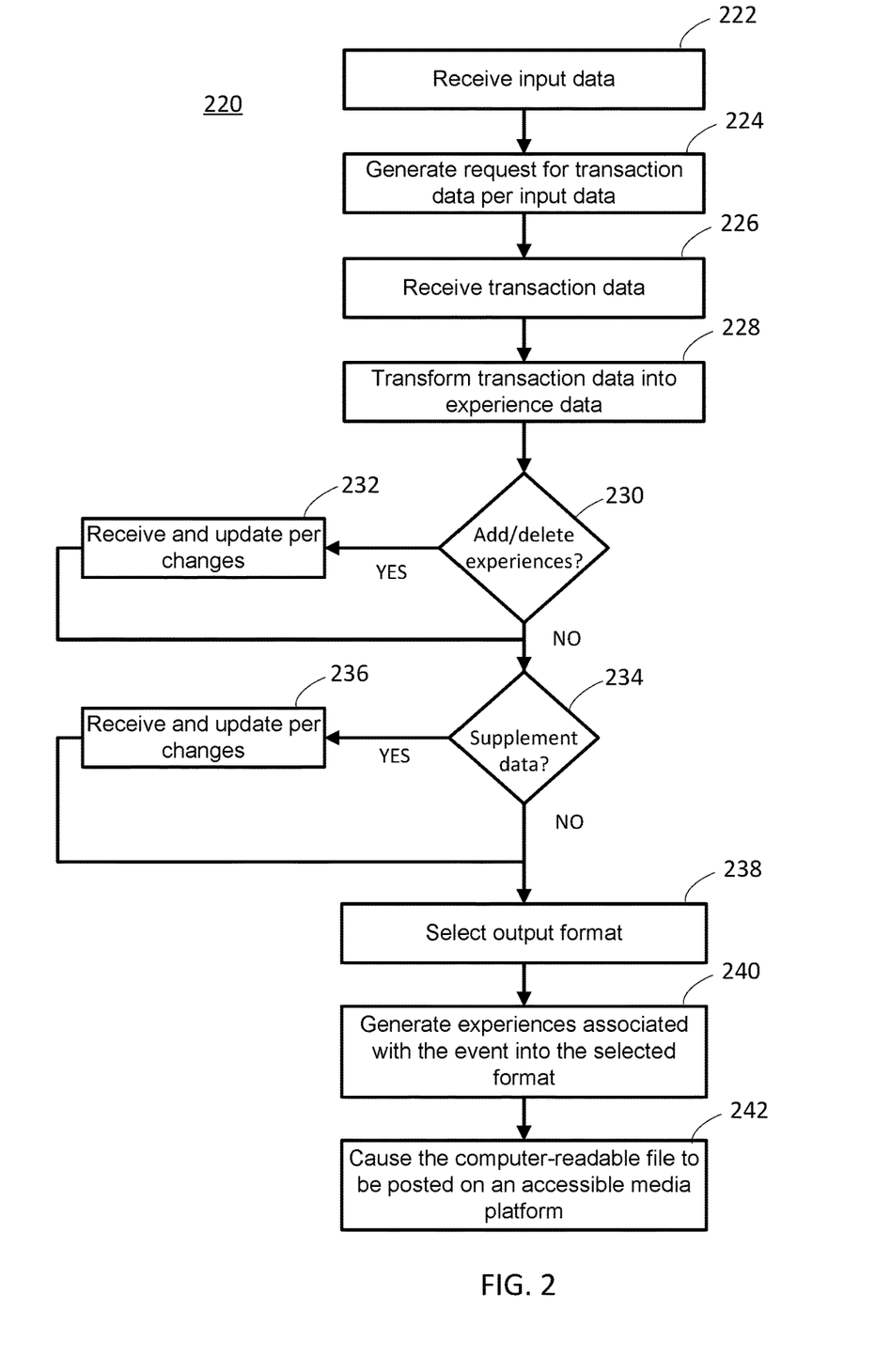
FIG. 2 is a flowchart of a generating a journal of an event using a journaling engine.
Figure 3:
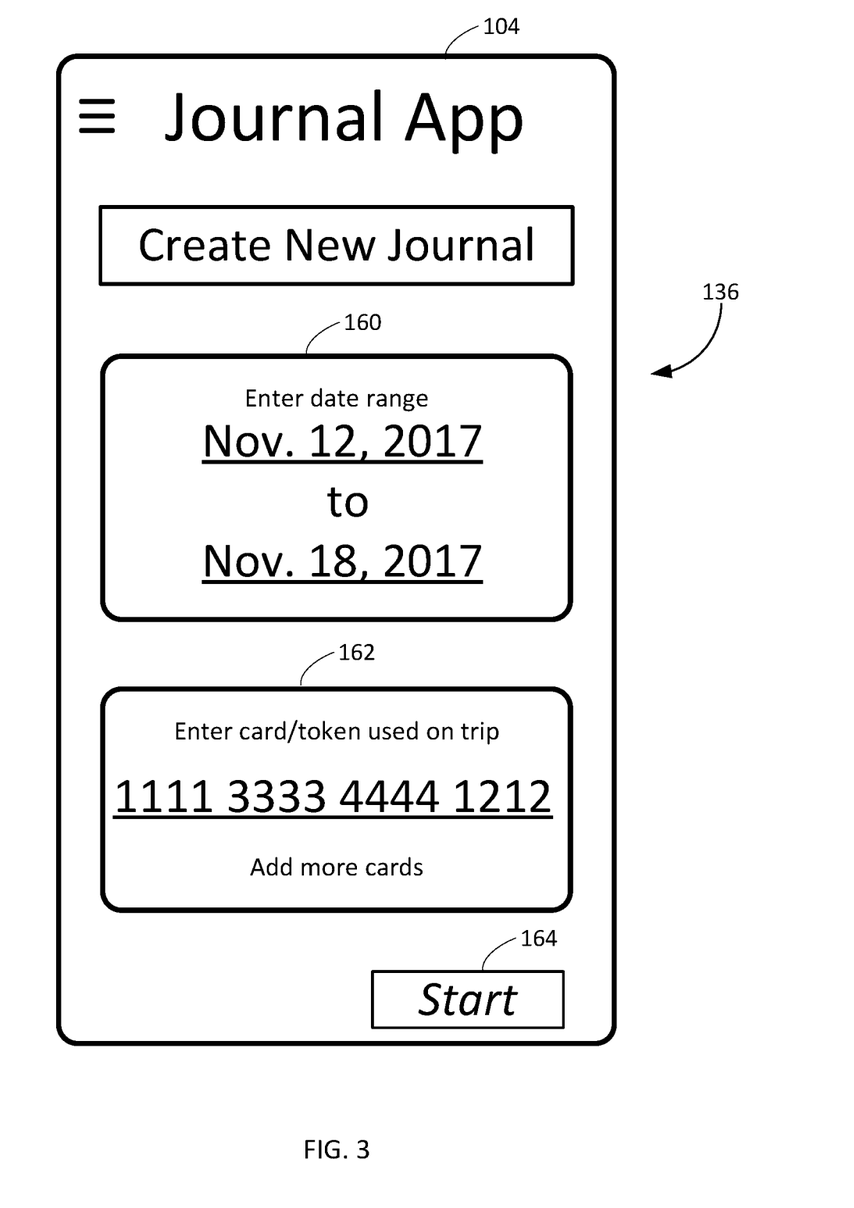
FIG. 3 illustrates a user interface of a computing device executing a journaling application to specify an event.

FIG. 2 is a flowchart of a method 220 of generating and displaying a journal associated with an event, such as a vacation. Sometimes, even a short event, such as a weekend out of town may be difficult to remember with accuracy. Restaurants, stores, attractions, and entertainment may run together after returning home so that the places visited and the sequence may be difficult to remember and reconstruct. At block 222, a user may specify information used by the journaling engine 102 to create a record of such a trip using payment information over the period of time of the event. By way of example, FIG. 3 illustrates an exemplary user interface on a user device 104 hosting a journaling application 136 opened to a "New Journal" selection page. The page may include a date entry window 160 and a token entry window 162. The date entry window 160 may be used to specify dates corresponding to an event, such as a trip, vacation, concert, etc., for which the user would like to create a journal. The token entry window 162 may allow a user to enter the number of a payment instrument that was used for the event. The token may represent a credit card, debit card, prepaid card, etc. In an embodiment, additional tokens may be entered, for example, something that may have been used by a travel companion during the event. When the data has been entered, the 'start' button 164 may be activated.

Returning to FIG. 2, at block 224, activating the start button 164 may cause the request data to be sent to the journaling engine 102 where the user interface 120 may receive the request. The user interface 120 or a related function may parse the request and generate a job identifier. In an embodiment, the job identifier may be assigned a tracking number that may be used a key for storing activities and external data associated with the event. Creation of the job identifier may generate a request on the transaction database 122 so that at block 226, the preprocessor 128 may receive the requested transaction data.

Figure 4:
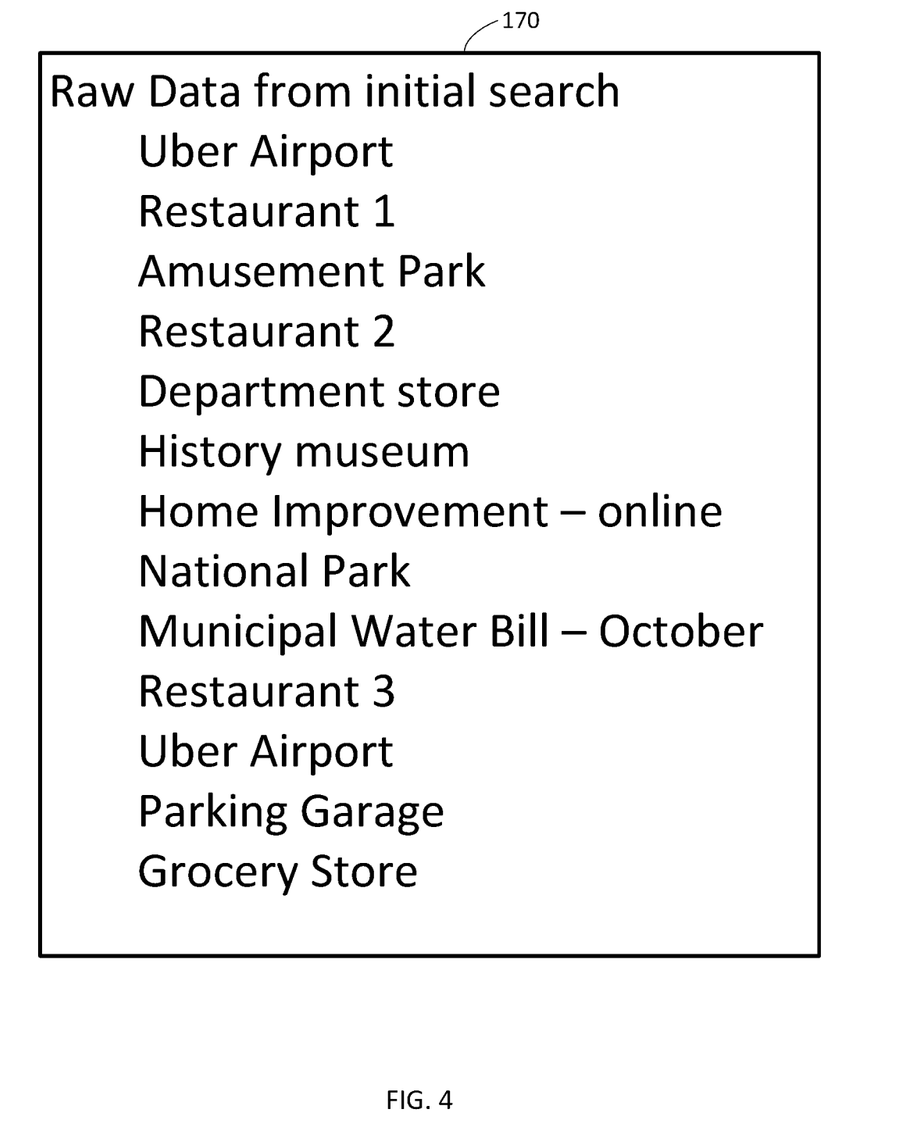
FIG. 4 is a representation of raw data returned after a journaling query.

Turning briefly to FIG. 4, raw data from the search may be received in the form of table 170, although a machine readable format may also be used. As mentioned above the table 170 of raw transaction data may be transformed at block 228 into experience data. For example, the filter 124 may remove data that is not associated with a journey or even a single experience, such as a recurring water bill, a purchase at a home improvement store, or a grocery store visit at the end of the date range occurring in the user's hometown. An artificial intelligence function (not depicted) may generate and apply a learning database to the selection of transactions to include. For example, the recurring water bill may always be excluded, but as opposed to a visit to a grocery store at the end of a trip, such an entry in the middle of trip prior to a visit to a national forest may be included. The formatter 126 may delete non-relevant information from the response such as transaction numbers, terminal identifiers, etc. The formatter 126 may also exclude certain personal data, such as addresses or personal account numbers.

Figure 5:
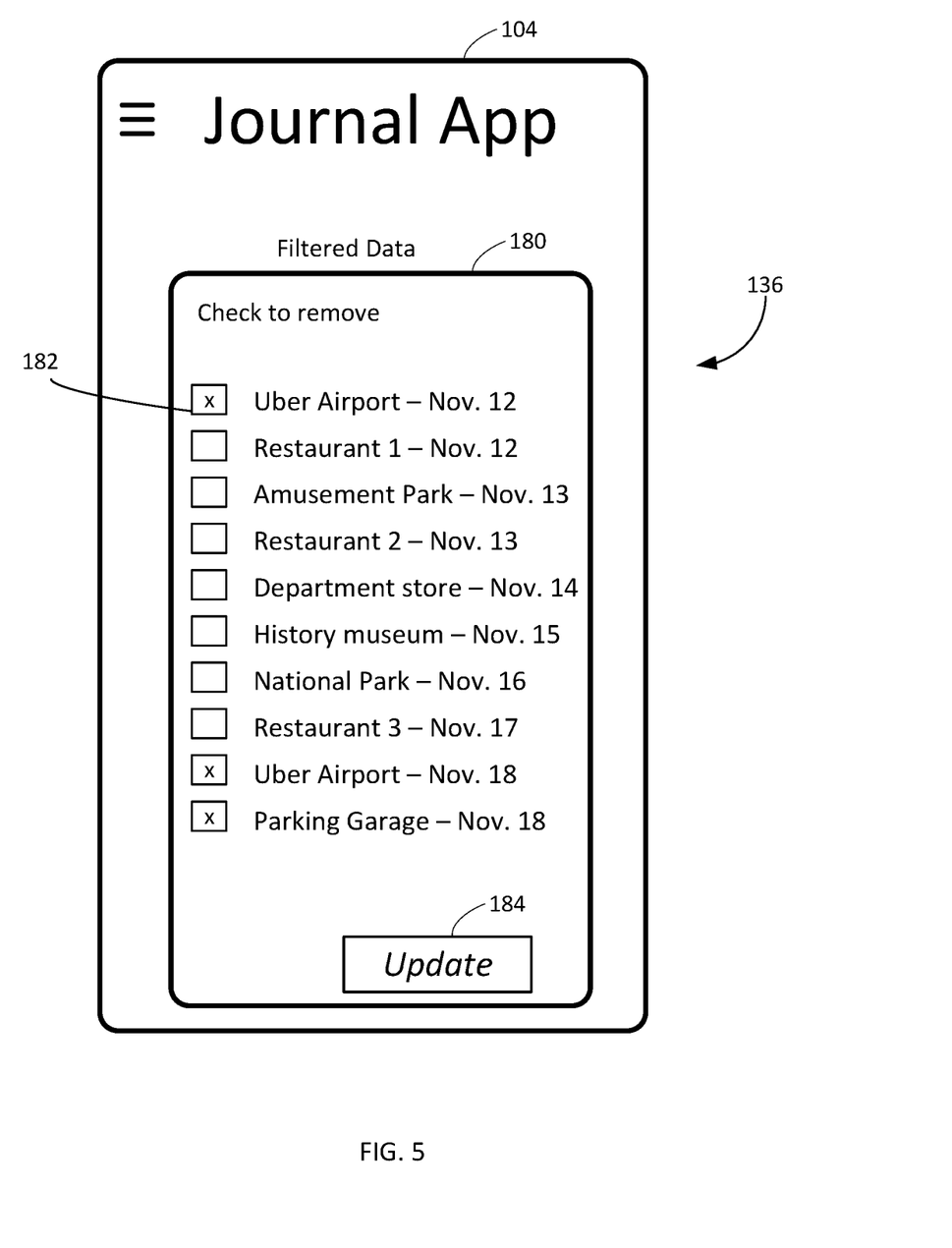
FIG. 5 illustrates a user interface of a journaling application showing selection of items.
Figure 6:
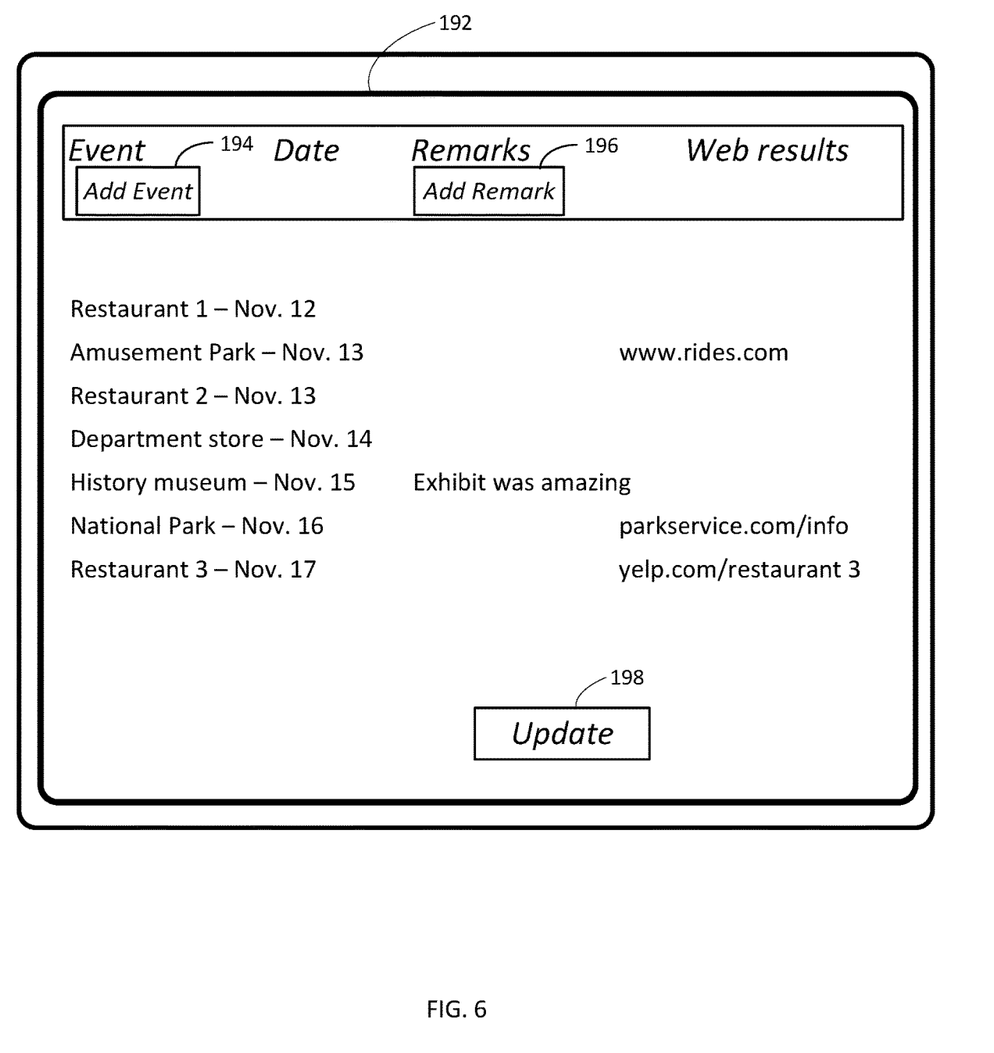
FIG. 6 illustrates a user interface illustrating editing event information.

At block 230 of FIG. 2, the user may be offered the chance to edit the filtered and formatted data, for example, to add or delete information. If so, execution may continue at block 232, where as illustrated in the depiction of FIG. 5, the user may be allowed to remove certain transactions that were included by the filtering process. As shown, the user has selected three transactions in window 180 to exclude using checkboxes 182. The user selections may be fed back to the AI function, if present, of the filter 124 to refine the filtering process. For example, the user may not want the use of Uber to be shown and the use of a parking garage may be related to the grocery store trip and not to the travel. After the user selects the update button 184, a second screen 192 illustrated in FIG. 6 may be presented that allows the user to add new events using button 194 and add remarks using button 196. For example, a visit to a park may not have involved any financial transactions so that the data received from the transaction database may not include such a visit. Remarks may be added as personal notes or to be shared if and when the end journal is published. After updates are completed or if a user selects at block 230 to not make any updates, execution may continue at block 234. There, a user may select to add supplemental data. If the user so chooses, execution may continue at block 236, where as shown in FIG. 6, additional information about a venue may be added, such as in the "Web Results" column. In an embodiment, some additional information may have been added by the synthesizer 118. For example, websites associated with a particular venue may have received from the location data source 130. However, the user may have provided a link to a third party website, such as a review site, related to a venue or activity. Updates may be recorded in real time or by activating the update button 198.

With or without supplemental changes at block 236, execution may continue at block 238 where the user may select an output format for the collected data. More specifically, the user may select a destination for the collected data, such as a social media site. Other formats/destinations may include a document format such as PowerPoint or even a graphical output such as an animated video of a timeline. After the format/destination is selected, at block 240, the export manager 112 may take the collected data and generate an output file suitable for the selected format or destination. At block 242, the generated file may be posted to the target system, such as a social media site or simply stored as a file in the given format. For example, FIG. 7 may be a screen 200 of a graph of a timeline of a trip on a social media site. Other outputs may include text only files, batch emails, text or group messaging applications, etc.

In another embodiment, the user may place a link to the journaling engine 102 on a social media site so that when a visitor to the user's page selects the link, the export manager may receive the data request, perform the required formatting for the requesting platform and generate an appropriate response.

Figure 7:
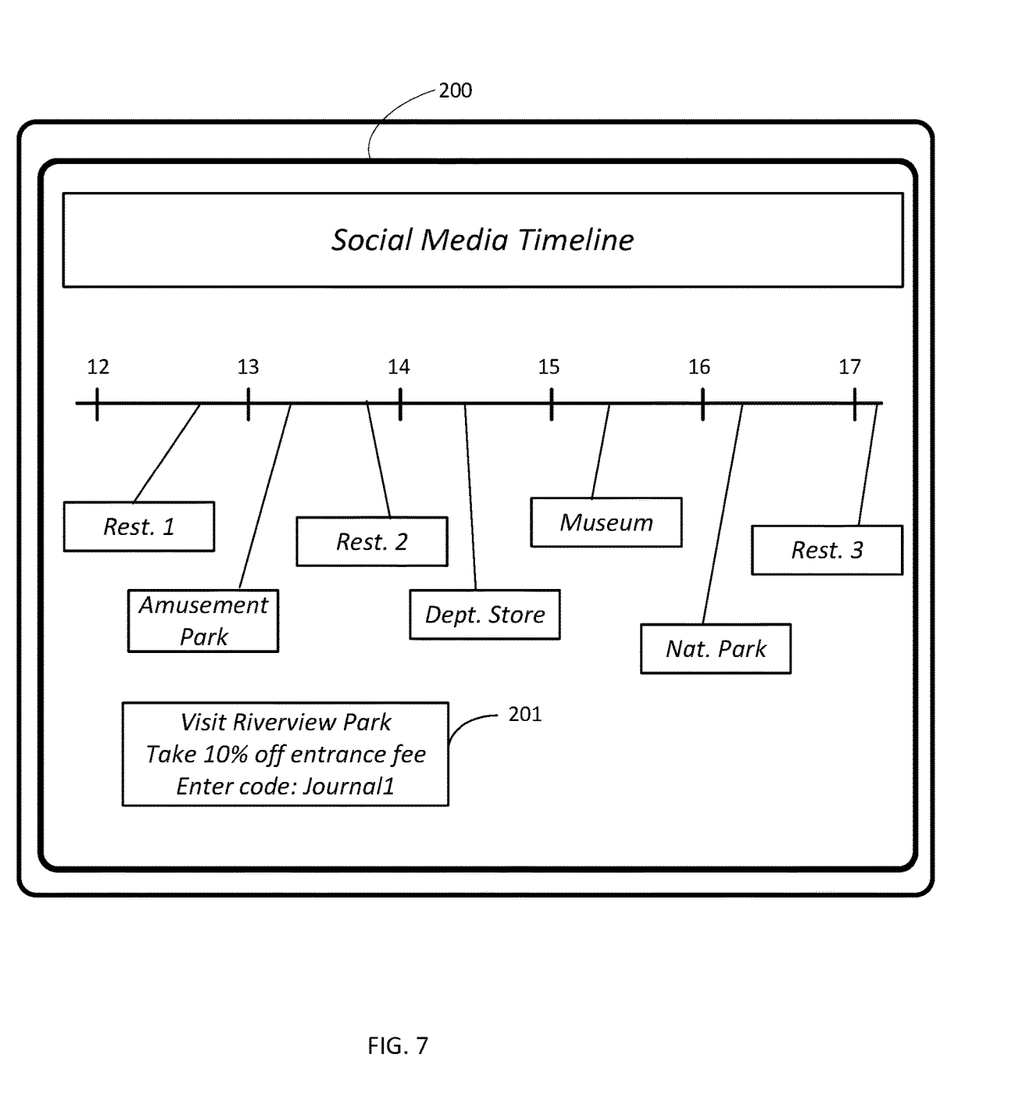
FIG. 7 illustrates a user interface showing an exemplary social media output screen.

FIG. 7 may also illustrate placement of a real time offer 201 on the social media display. The offer 201 may be received from the recommendations engine 106 in response to generation of a particular output format or sharing request. The real time offer may 201 may be generated at the time the data is exported, whether posted by the user or whether requested by a person viewing the user's social media page.

Figure 8:
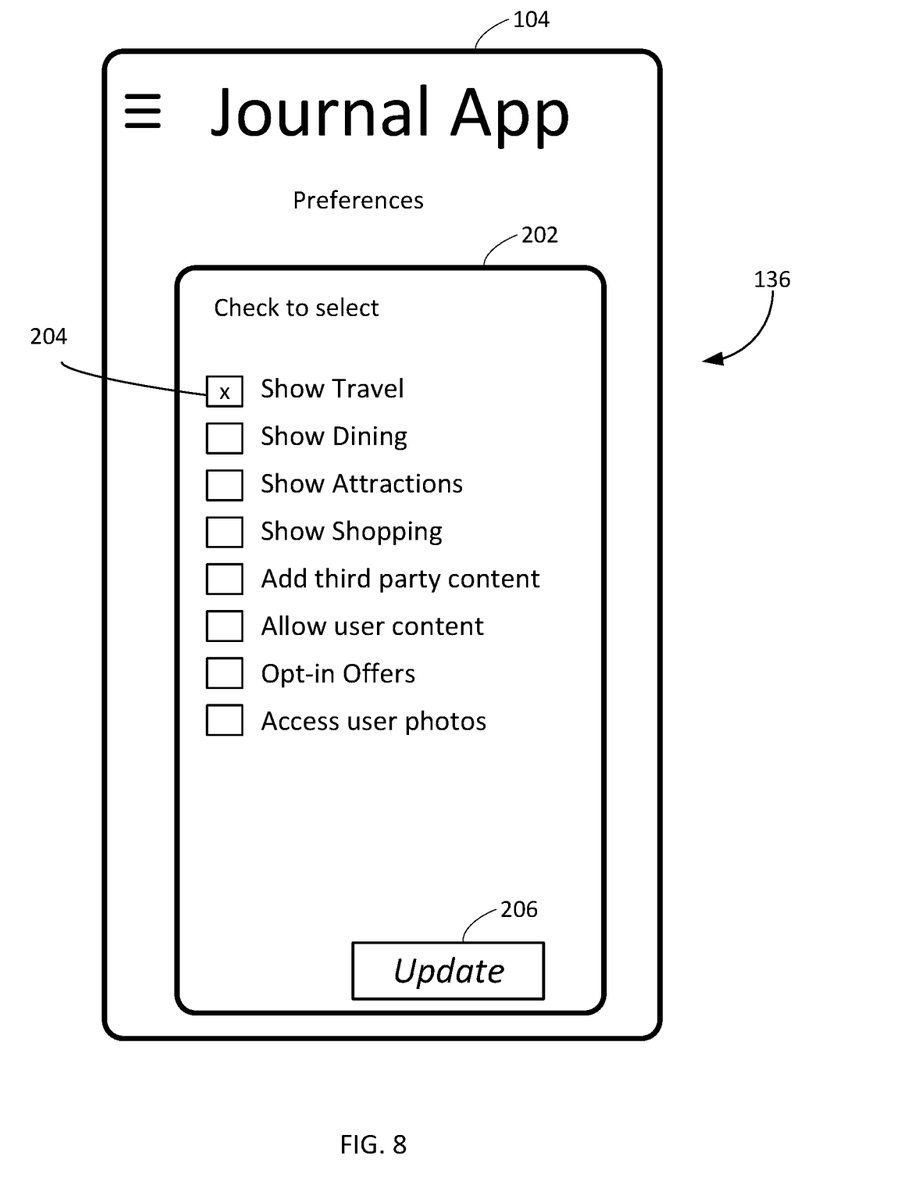
FIG. 8 illustrates user interface illustrating setting preferences for the journaling application.

FIG. 8 illustrates an exemplary screen 202 for entering user preferences via a journaling application 136 on a user device 104. The user may select using a checkbox various items to include from a search result as well as specific categories to include or exclude. The user may also specify whether to allow the journaling engine 102 to add content such as websites and reviews or whether to ask the user for additional information before generating the journal output. Selecting opt-in offers may allow the user to control advertising or coupons to be added to the user's journal content. In another example of settings, the user may allow the journaling engine to access the user device 104 to retrieve photos from the time period of the request to allow automatically adding selected photos using a photo categorization and rating system (not depicted). The technology for such photo categorization systems is known. An update button 206 may allow the user to accept the proposed settings by communicating the changes to the journaling engine's preferences function 116.

A technology problem solved is scaling the system for extreme high volume and large content size, including transaction data, map data, related site data, and the interface to a recommendations engine. The journaling engine described above uses preprocessors for formatting received data and customized databases for fast storage and retrieval based on the type of output requested. The journaling engine also includes customized formatters for generating output in one of many specified formats based on the ultimate destination, from personal consumption to social media platforms.

A system and method in accordance with the current disclosure benefits both users and businesses. A user may be provided with a convenient way to reconstruct and document an event simply by entering the dates and tokens used.

The user may be able to select from different formats and share the event details on different social media platforms at the touch of a button. At the same time, businesses may use the sharing process for targeted placement of advertisements, offers, and recommendations based on both the user's experience and the viewer's interest in that particular event.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A journaling engine comprising:
a processor;
a memory coupled to the processor;
a user interface module that generates customized display data related to capture of input from a user related to a date range and a financial instrument, the user interface module including an output formatter that retrieves data and generates coded data used to populate at least one of a display and a social media platform;
a preprocessor coupled to the processor, the preprocessor receiving transactions associated with the financial instrument from a transaction source, the preprocessor including a data filter and a data re-formatter;
a synthesizer having a data connection to an outside information source, being independent from a data source managed by the transaction source, the synthesizer generating search queries to the outside information source for obtaining supplemental data regarding a destination identified via an output of the data filter, wherein the obtained supplemental data includes at least images, geolocation information, or event information retrieved from the outside information source or a mobile device hosting the user interface module, wherein the outside information source comprises a storage of photographs of the user;
the user interface module further operating to receive instructions from the user related to sharing of the preprocessed data; and
an export module that generates page display-formatted data based on a target system identified via the capture of the instructions from the user.

2. The journaling engine of claim 1, further comprising:
a second preprocessor coupled to the processor and to a database of recommended venues related to one or more journal entries.

3. The journaling engine of claim 2, comprising a data filter that removes transactions unrelated to a travel event.

4. The journaling engine of claim 3, wherein the data filter characterizes travel-related transactions by applying a heuristic to determine transactions related to the travel event.

5. The journaling engine of claim 1, wherein data re-formatter places all transaction data in a common format and removes non-shared personally identifiable information (PII).

6. The journaling engine of claim 1, further comprising a preferences module that generates a custom user interface for receiving preference information from the user, the preference information securely provided via a network interface to an external source of business offers related to a current or future travel event.

7. The journaling engine of claim 1, further comprising a journal data repository storing an ordered sequence of records received from the preprocessor, the ordered sequence of records in time order.

8. The journaling engine of claim 7, wherein the journal data repository is indexed according to a date range.

9. A method of generating a journal of events, the method comprising:
receiving an indicator of a payment instrument and a date range corresponding to an event from a user via a user interface of a personal computing device;
generating a request for transaction data for the payment instrument over the date range of the event;
receiving a result of the request for the transaction data;
filtering the result to remove transaction data unrelated to the event;
generating a list of transactions associated with the event;
transforming transaction data into experience data including one or more experiences associated with the event by generating search queries to an outside information source, being independent from a data source managed by the transaction source;
synthesizing the experience data with at least the following information received from the outside information source or a mobile device: images, geolocation information, or event information, wherein the outside information source comprises a storage of photographs of the user;
receiving instructions from the user interface for generating an output format in one of a plurality of predetermined output formats;
generating the experiences associated with the event into a computer-readable file using the instructed output format; and
causing the computer-readable file to posted on an accessible media device.

10. The method of claim 9, wherein the event is a travel event.

11. The method of claim 9, wherein the plurality of output formats correspond to a plurality of social media outlets.

12. The method of claim 9, further comprising adding, via the user interface, an additional experience to the experience data.

13. The method of claim 9, further comprising removing, via the user interface, an existing transaction from the transaction data associated with the event.

14. The method of claim 9, wherein transforming transaction data into experience data associated with the event comprises extracting a venue name from the transaction data.

15. The method of claim 14, wherein transforming transaction data into experience data associated with the event further comprises searching for data about the venue and adding selected information about the venue to the experience data.

16. The method of claim 9, wherein transforming transaction data into experience data associated with the event further comprises extracting a date and time associated with an individual experience.

17. A method of generating a journal of events, the method comprising:
- receiving an indicator of a payment instrument and a date range corresponding to an event from a user via a user interface of a personal computing device;
- generating a request for transaction data for payment instrument over the date range of the event;
- receiving a result of the request for the transaction data;
- filtering the result to remove transaction data unrelated to the event;
- generating a list of transactions associated with the event;
- transforming transaction data into experience data including one or more experiences associated with the event by generating search queries to an outside information source, being independent from a data source managed by the transaction source, each experience including at least a location and a time;
- synthesizing the experience data with at least the following information received from the outside information source or a mobile device: images, geolocation information, or event information, wherein the outside information source comprises a storage of photographs of the user;
- receiving instructions to one of add or delete an experience to the experience data;
- receiving instructions from the user interface for generating an output format in one of a plurality of predetermined output formats;
- generating the experiences associated with the event into a computer-readable file using the instructed output format; and
- causing the computer-readable file to posted on an accessible media device.

18. The method of claim 17, wherein transforming transaction data into experience data associated with the event comprises extracting a name of a venue from the transaction data.

19. The method of claim 18, wherein transforming transaction data into experience data associated with the event comprises retrieving publicly available information about the venue to be included in the experience data.

* * * * *